Patented Dec. 6, 1938

2,139,123

UNITED STATES PATENT OFFICE 2,139,123

AMINOALCOHOL

Henry B. Hass, West Lafayette, and Byron M. Vanderbilt, Terre Haute, Ind., assignors to Purdue Research Foundation, La Fayette, Ind., a corporation of Indiana No Drawing. Application August 13, 1937, Serial No. 158,957

1 Claim. (Cl. 260—584)

Our invention relates to a new and useful aliphatic aminoalcohol and, more particularly, to an aminoalcohol wherein the carbon atom attached to the amino group is adjacent to the carbon atom attached to the hydroxyl group.

The aminoalcohol of our invention has been found to be of particular value for use as a corrosion inhibiting agent in anti-freeze solutions. This compound is an organic base containing free amino and hydroxyl groups and various other uses for it will readily occur to persons skilled in the art. Specifically, the aminoalcohol of our invention is 2-amino-1-pentanol.

This aminoalcohol may be suitably prepared by any of the known methods of reducing a nitro to an amino group provided that the conditions are not sufficiently drastic to cause splitting of the molecule. We prefer, however, to prepare this compound by the catalytic hydrogenation of the corresponding nitro compounds in accordance with the process of copending application Serial No. 151,841 filed July 3, 1937. According to this process the nitroalcohol is hydrogenated at atmospheric or increased pressures in the presence of a nickel catalyst in the liquid phase with or without an auxiliary solvent at temperatures below 165° C., and preferably between 15° C. and 150° C. In general, any hydrogenation catalyst may be used that is active within the temperatures employed. We prefer, however, to use a powdered nickel catalyst that is prepared in the following manner: A nickel-aluminum alloy is prepared in the powdered form, a suitable alloy containing 50% aluminum and 50% nickel. The aluminum is dissolved out of the powdered alloy by strong alkali solution, and the nickel residue is washed free from alkali and salts with water and kept under liquid. This catalyst is active at temperatures around 25° C. and may be used repeatedly without losing its activity. Hydrogenation may be carried out at hydrogen pressures varying from atmospheric pressure to over 2,000 pounds per square inch. The rate of reaction is directly proportional to the hydrogen pressures and the temperatures employed. Thus, at a hydrogen pressure of 600 pounds per square inch and at temperatures from 60 to 70° C. under the conditions we have employed, the hydrogenation will, in general, be found to be complete after a period of 15 to 45 minutes. Lower pressures and lower temperatures will in general require longer times for the hydrogenation reaction to be completed and, conversely, higher pressures and temperatures will in general shorten the time for completion of the hydrogenation reaction. Optimum pressures and temperatures may be readily determined by simple experimentation and will depend, to some extent, on the amount of catalyst and solvent employed, the surface of the reaction mixture exposed to the hydrogen, the rate of agitation, and the tendency for the nitroalcohol to decompose at higher temperatures under the conditions employed. Methyl or ethyl alcohol may be employed as solvents.

After the reaction has been effected the catalyst may be separated from the reaction mixture by any suitable means such as filtration or decantation and the aminoalcohol separated from the solution by fractional distillation. The aminoalcohol may be further purified by refractionation at atmospheric or reduced pressures, or by fractional crystallization of certain of its salts such as the oxalate or hydrochloride.

The following example illustrates a suitable procedure for the preparation of the aminoalcohol of our invention:

Example

One-hundred and thirty-three parts by weight of 2-nitro-1-pentanol were mixed with 360 parts of methyl alcohol, 40 parts of water, and 7½ parts of a nickel catalyst, prepared as described in the foregoing, and the mixture was introduced into a suitable pressure hydrogenation apparatus and sealed. Hydrogen was then introduced into the apparatus at room temperature at about 500 pounds per square inch at such a rate that the reaction temperature did not go above 55° C. Hydrogenation was carried out for 2½ hours with constant agitation. At the conclusion of the hydrogenation the reaction mixture was removed from the hydrogenation apparatus and the catalyst separated from the solution by filtration. The solution was subjected to fractional distillation, and 2-amino-1-pentanol was distilled over.

The aminoalcohol of our invention is a viscous colorless liquid at room temperature. It is extremely stable at temperatures up to at least 200° C. and is soluble in the ordinary organic solvents such as methyl alcohol, acetone, and benzene. This compound boils at 194 to 195° C. at 760 mm. of mercury (corrected). The refractive index at 20° C. is 1.4511, and its specific gravity is 0.9217 (25/4).

Since the number of preparations of the compound examined was limited, it should be understood that while the properties given will be useful in identifying the compound of our invention, we do not wish to limit ourselves to a product having the exact properties listed.

The 2-nitro-1-pentanol used in the preparation of the 2-amino-1-pentanol described above may be prepared by any suitable method for introducing the nitro group into an aliphatic compound. However, we prefer to prepare this compound in accordance with the process of copending application Ser. No. 146,855 of Byron M. Vanderbilt, filed June 7, 1937. According to this process, a primary or secondary nitroparaffin and an aliphatic aldehyde are reacted in the presence of an auxiliary solvent, such as ethyl alcohol, and in the presence of an alkaline catalyst, such as sodium hydroxide, the aldehyde being slowly added to a solution of the nitroparaffin and catalyst in the auxiliary solvent while thoroughly agitating.

The aminoalcohol of our invention is particularly useful as a corrosion inhibitor in anti-freeze solutions used in the cooling systems of internal combustion motors. For example, the aminoalcohol of our invention may be added to a water or water-alcohol solution in concentrations of from 0.1 to 1.0%, and thereby substantially inhibit corrosion of the metal by the solution. Due to the basic nature of this compound it may also be utilized to absorb acids such as hydrogen sulfide or carbon dioxide from industrial gases. The aminoalcohol of our invention is also useful as an intermediate for the preparation of numerous organic compounds, and various other uses of this material will be apparent to those skilled in the art.

Our invention now having been described, what we claim is:

2-amino-1-pentanol.

HENRY B. HASS.
BYRON M. VANDERBILT.